(12) United States Patent
Curtin et al.

(10) Patent No.: US 6,916,853 B2
(45) Date of Patent: Jul. 12, 2005

(54) COMPOSITIONS CONTAINING PARTICLES OF HIGHLY FLUORINATED ION EXCHANGE POLYMER

(75) Inventors: Dennis Edward Curtin, Fayetteville, NC (US); Edward George Howard, Jr., Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 25 days.

(21) Appl. No.: 10/325,283

(22) Filed: Dec. 20, 2002

(65) Prior Publication Data

US 2003/0176515 A1 Sep. 18, 2003

Related U.S. Application Data

(62) Division of application No. 09/630,826, filed on Aug. 2, 2000, now Pat. No. 6,552,093, which is a division of application No. 08/950,457, filed on Oct. 15, 1997, now Pat. No. 6,150,426.
(60) Provisional application No. 60/028,501, filed on Oct. 15, 1996.

(51) Int. Cl.[7] .................................................. C08J 5/20
(52) U.S. Cl. .............................. 521/28; 521/27; 521/25; 521/31; 521/29; 524/755; 524/757; 524/765; 524/766; 528/494; 528/495
(58) Field of Search .............................. 521/28, 27, 25, 521/31, 29; 524/755, 757, 765, 766; 528/494, 495; 525/199, 200

(56) References Cited

U.S. PATENT DOCUMENTS

| | | | |
|---|---|---|---|
| 3,282,875 A | | 11/1966 | Connolly et al. ........... 260/29.6 |
| 3,692,569 A | | 9/1972 | Grot ........................ 117/138.8 |
| 4,348,310 A | | 9/1982 | Silva et al. .................. 524/167 |
| 4,358,545 A | | 11/1982 | Ezzell et al. .................. 521/27 |
| 4,433,082 A | * | 2/1984 | Grot ............................ 524/544 |
| 4,453,991 A | | 6/1984 | Grot ............................ 156/94 |
| 4,540,716 A | | 9/1985 | Covitch et al. ................ 521/28 |
| 4,544,458 A | * | 10/1985 | Grot et al. ................... 205/521 |
| 4,650,551 A | | 3/1987 | Carl et al. ................. 204/59 R |
| 4,650,711 A | | 3/1987 | Carl et al. ................... 428/265 |
| 4,661,411 A | | 4/1987 | Martin et al. ................ 428/421 |
| 4,731,263 A | | 3/1988 | Martin et al. .............. 427/385.5 |
| 4,940,525 A | | 7/1990 | Ezzell et al. ................. 204/252 |
| 5,718,947 A | * | 2/1998 | Martin et al. ................ 427/243 |
| 6,200,294 B1 | * | 3/2001 | Liu ............................. 604/198 |
| 6,294,612 B1 | * | 9/2001 | O'Brien ....................... 525/199 |
| 6,552,093 B1 | * | 4/2003 | Curtin et al. .................. 521/28 |

FOREIGN PATENT DOCUMENTS

| | | | | |
|---|---|---|---|---|
| EP | 0 030 104 | | 11/1980 | ............. C08J/3/02 |
| EP | 0 066 369 A1 | | 4/1982 | .......... C08L/27/18 |
| EP | 0 066 369 | * | 12/1982 | .......... C08L/27/18 |
| EP | 203 577 A2 | | 5/1986 | ............. C08J/3/08 |
| EP | 0 245 144 | | 4/1987 | ............. C08J/3/08 |
| EP | 0 326 632 A1 | | 2/1988 | ............. C08J/5/22 |
| EP | 0 245 144 B1 | | 3/1991 | ............. C08J/3/11 |
| GB | 1 286 859 | | 11/1969 | |
| WO | WO 94/00511 | | 1/1994 | ............. C08J/9/18 |
| WO | WO 95/24976 | | 9/1995 | ............ B05D/3/10 |

OTHER PUBLICATIONS

Chemical and Morphological Properties of Solution–Cast Perfluorosulfonate Ionomers, R. B. Moore, III and C. R. Martin, 1988 American Chemical Society, Macromolecules 1988, 21, pp. 1334–1339.

Morphology and Chemical Properties of the Dow Perfluorosulfonate Ionomers, Robert B. Moore, III and Charles R. Martin, 1989 American Chemical Society, Marcomolecules, 1989, 22, pp. 3594–3599.

P. Aldebert et al., Rod like micellar structures in perfluorinated ionomer solutions, *J. Phys. France*, 49, 2101–2109, Dec. 1988.

* cited by examiner

Primary Examiner—Tatyana Zalukaeva

(57) ABSTRACT

Solid and liquid compositions containing particles of highly fluorinated ion-exchange polymer having sulfonate functional groups with an ion exchange ratio of less than about 33. The compositions contain at least about 25% by weight of polymer particles having a particle size of about 2 nm to about 30 nm.

5 Claims, 2 Drawing Sheets

COMPOSITIONS CONTAINING PARTICLES OF HIGHLY FLUORINATED ION EXCHANGE POLYMER

BACKGROUND OF THE INVENTION

The present invention relates to solid and liquid compositions containing particles of highly fluorinated ion exchange polymer having sulfonate functional groups, a process for making such compositions, and products made using such compositions.

Liquid compositions of perfluorinated ion exchange polymers are known for use in the manufacture and repair of ion exchange membranes, for membrane coatings containing conductive or nonconductive particles, and for many other uses. While such compositions are sometimes referred to as solutions, the compositions are generally recognized as being dispersions of polymer particles.

U.S. Pat. No. 4,433,082 to Grot discloses a process for preparing such liquid compositions containing perfluorinated ion-exchange polymers having sulfonic acid groups or a salt thereof and having equivalent weights of 1025 to 1500. The medium preferred for use in U.S. Pat. No. 4,433,082 contains 20 to 90% by weight of water and 10 to 80% by weight of an organic compound such as a lower alcohol. While U.S. Pat. No. 4,433,082 indicates that liquid compositions can be prepared using water only, no useful processes for making liquid compositions without alcohols are disclosed.

Compositions made in accordance with U.S. Pat. No. 4,433,082 and containing water together with one or more lower alcohols are sold commercially under the trademark NAFION® by E.I. du Pont de Nemours and Company. Currently, the commercial compositions can contain up to 10% by weight of a perfluorinated ion-exchange polymer having sulfonic acid groups in a medium of approximately 30–60% by weight water, 15–30% by weight 1-propanol, 15–30% by weight 2-propanol, and less than 10% by weight (total) of miscellaneous components consisting of methanol, mixed ethers and other volatile organic compounds (VOC's). A typical commercial composition contains a nominal 5% by weight of the perfluorinated ion-exchange polymer having sulfonic acid groups in a medium of approximately 45% by weight water, 22% by weight 1-propanol, 22% by weight 2-propanol, 3% by weight methanol and 3% of mixed ethers and other VOC's.

For many uses, the alcohol in these compositions is undesirable. For example, known compositions are often used in the manufacture of electrodes containing catalyst particles for electrochemical cells such as fuel cells. Exposure of alcohol vapors to the catalyst particles can cause undesirable side reactions and can even be a fire hazard. In general, the presence of an alcohol means that the alcohol or its decomposition products will be released into the atmosphere when the composition is used. Releases of VOC's result, not only in the loss of the compounds, but are subject to reporting requirements and limits imposed by environmental authorities. Recovery systems can be employed but they generally require a large investment, are expensive to operate, and may not be cost effective, particularly for small scale operations.

The alcohol in known compositions can be partially or entirely removed to produce a composition which contains less alcohol or essentially only water by processes such as vacuum distillation. However, such compositions are expensive because of the additional processing steps. In addition, the problems relating to alcohol release or recovery are associated with the process used to remove alcohol from the compositions.

Nonaqueous compositions containing alcohol or another organic medium with little or no water content are also desired for some applications. While known compositions containing a mixture of water and alcohol can be converted to alcohol only compositions by processes such as azeotropic distillation, these processes are time consuming and expensive. Nonaqueous compositions in a nonaqueous media other than alcohol have are not typically been available due to the difficulty in manufacture.

Moreover, commercially-available compositions typically have a low concentration of polymer (in the range of about 5% by weight) and are unsuitable for applications where higher concentrations are desired. For example, when coatings are made, it is often necessary to use processes which employ repetitive applications of the composition to make the desired coating thickness and such processes are usually complicated, time consuming and costly.

SUMMARY OF THE INVENTION

The present invention provides solid and liquid compositions comprising particles of highly fluorinated ion-exchange polymer having sulfonate functional groups with an ion exchange ratio of less than about 33. At least about 25 weight % of the particles in the composition have a particle size of about 2 nm to about 30 nm. Preferably, the compositions contain at least about 50% by weight, most preferably 90% by weight, of particles having a particle size of about 2 nm to about 30 nm. Preferably, the solid composition is dispersible in water at room temperature and most preferably forms a stable colloid.

In accordance with another aspect of a solid composition in accordance with the invention, the particles have a structure in which the polymer chains are folded so that the fluorine atoms are oriented towards the particle interior and the sulfonate groups are concentrated on the surface. In accordance with preferred form of the invention, sufficient sulfonate groups are on the surface to make the material redispersible in water at room temperature. Moreover, it is preferred for at least 50% of the particles to be monomolecular, i.e., that each particle consists of essentially one polymer molecule. Most preferably, at least 90% of the particles are monomolecular. Preferably, at least about 25% by weight of said particles have a particle size of about 2 nm to about 30 nm.

The liquid compositions in accordance with the invention can contain either an aqueous liquid medium or nonaqueous liquid medium with 0.5 to about 50% by weight of the polymer. The aqueous liquid compositions are preferably substantially free of water miscible alcohols and more preferably are substantially free of all organic liquids. In one preferred form of the invention, the medium consists essentially of water. The nonaqueous compositions contain less than about 5% by weight water and preferably the nonaqueous medium comprises a polar, small molecule organic liquid.

Liquid compositions also containing particles having a different composition than the ion exchange particles are also provided by the invention.

The invention also provides a process for preparing an aqueous liquid composition comprising particles of highly fluorinated ion-exchange polymer having sulfonate functional groups and having an ion exchange ratio of less than about 33. The process includes contacting the polymer in a pressurized vessel with an aqueous liquid dispersion medium under conditions which cause the polymer to form particles with at least about 25% by weight of said particles having a particle size of about 2 nm to about 30 nm. The contents of the vessel is cooled to a temperature of less than about 100° C. and an aqueous liquid composition comprising particles of the highly fluorinated ion-exchange polymer is recovered. Preferably, the dispersion medium for use in the process is substantially free of water miscible alcohols, the temperature is about 150° C. to about 300° C., and the contents of the vessel is agitated sufficiently to subject the contents of the vessel to a shear rate of at least about 150 sec$^{-1}$.

In one preferred form of the invention, the dispersion medium consists essentially of water.

In another preferred form of the invention, the dispersion medium comprises 0.5 to 75% by weight of a dispersion assist additive selected from the group consisting of nonreactive, substantially water immiscible organic compounds and carbon dioxide.

The aqueous compositions produced in the process can be converted to solid compositions in accordance with the invention by removing liquid components, preferably by evaporation at a temperature less than the coalescence temperature of the ion exchange polymer.

The invention also provides processes for making films and elongated articles such as fibers from highly fluorinated ion exchange polymers and articles containing a substrate coated or impregnated with fluorinated ion exchange polymers.

Figure 1:
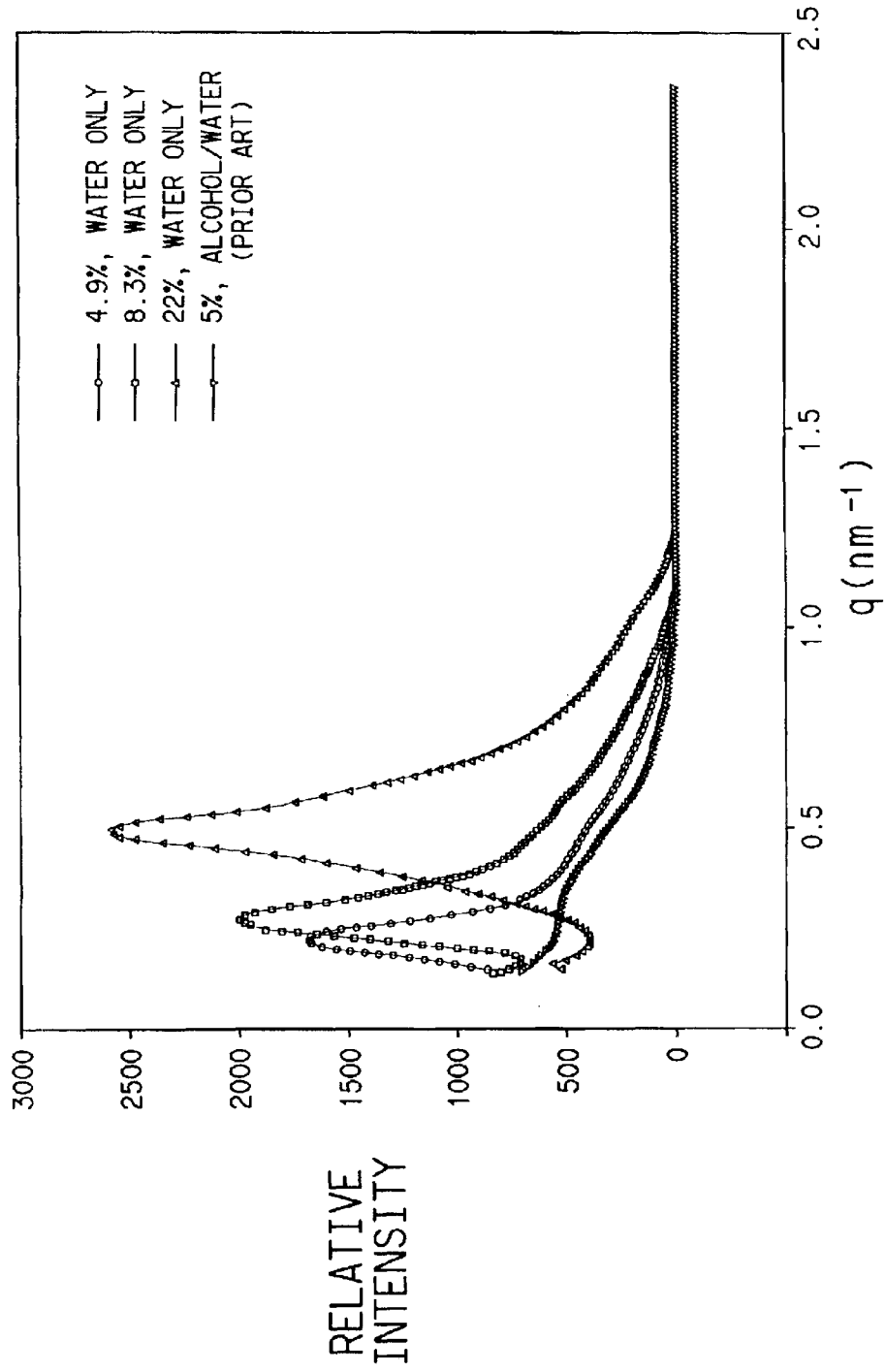
FIG. 1 is a graphical representation of small angle X-ray scattering (SAXS) data in which relative intensity is plotted against scattering vector (q) in nm$^{-1}$ for samples of liquid compositions in accordance with the invention and a prior art liquid composition prepared as in U.S. Pat. No. 4,433,082.

DETAILED DESCRIPTION
Ion Exchange Polymers

Polymers for use in accordance with the present invention are highly fluorinated ion-exchange polymers having sulfonate functional groups. "Highly fluorinated" means that at least 90% of the total number of halogen and hydrogen atoms in the polymer are fluorine atoms. Most preferably, the polymer is perfluorinated. The term "sulfonate functional groups" is intended to refer to either to sulfonic acid groups or salts of sulfonic acid groups, preferably alkali metal or ammonium salts. Most preferably, the functional groups are represented by the formula $—SO_3X$ wherein X is H, Li, Na, K or $N(R^1)(R^2)(R^3)$ $(R^4)$ and $R^1$, $R^2$, $R^3$, and $R^4$ are the same or different and are H, $CH_3$ or $C_2H_5$. For applications where the polymer is to be used for proton exchange, the sulfonic acid form of the polymer is preferred, i.e., where X is H in the formula above.

Preferably, the polymer comprises a polymer backbone with recurring side chains attached to the backbone with the side chains carrying the cation exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl fluoride group ($—SO_2F$), which can be subsequently hydrolyzed to a sulfonate functional group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate functional groups or precursor groups which can provide the desired side chain in the polymer. The first monomer may also have a side chain which does not interfere with the ion exchange function of the sulfonate functional group. Additional monomers can also be incorporated into these polymers if desired.

A class of preferred polymers for use in the present invention include a highly fluorinated, most preferably perfluorinated, carbon backbone and the side chain is represented by the formula $—(O—CF_2CFR_f)_a—O—CF_2CFR'_fSO_3X$, wherein $R_f$ and $R'_f$ are independently selected from F, Cl or a perfluorinated alkyl group having 1 to 10 carbon atoms, a=0,1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula $—O—CF_2CF(CF_3)—O—CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2=CF—O—CF_2CF(CF_3)—O—CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanging if needed to convert to the desired form. One preferred polymer of the type disclosed in U.S. Pat. Nos. 4,358,545 and 4,940,525 has the side chain $—O—CF_2CF_2SO_3X$, wherein X is as defined above. This polymer can be made by copolymerization of tetrafluoroethylene (TFE) and the perfluorinated vinyl ether $CF_2=C—O—CF_2CF_2SO_2F$, perfluoro(3-oxa-4-pentenesulfonyl fluoride) (POPF), followed by hydrolysis and acid exchange if needed.

The polymers have an ion exchange ratio of less than about 33. In this application, "ion exchange ratio" or "IXR" is defined as number of carbon atoms in the polymer backbone in relation to the cation exchange groups. Within the range of less than about 33, IXR can be varied as desired for the particular application. With most polymers, the IXR is preferably about 3 to about 33, more preferably about 8 to about 23.

For polymers of this type, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a pertluorocarbon backbone and the side chain is $—O—CF_2—CF(CF_3)—O—CF_2—CF_2—SO_3H$ (or a salt thereof, the equivalent weight range which corresponds to an IXR of about 8 to about 23 is about 750 EW to about 1500 EW. IXR for this polymer can be related to equivalent weight using the following formula: 50 IXR+344=EW.

While generally the same IXR range is used for sulfonate polymers disclosed in U.S. Pat. Nos. 4,358,545 and 4,940,525, e.g., the polymer having the side chain —O—$CF_2CF_2SO_3H$ (or a salt thereof), the equivalent weight is somewhat lower because of the lower molecular weight of the monomer unit containing a cation exchange group. For the preferred IXR range of about 8 to about 23, the corresponding equivalent weight range is about 575 EW to about 1325 EW. IXR for this polymer can be related to equivalent weight using the following formula: 50 IXR+178=EW.

Compositions

The compositions in accordance with the invention, in both solid and aqueous or nonaqueous forms, have a significantly higher weight percentage of particles having a particle size of about 2 nm to about 30 nm than do compositions prepared by the process of U.S. Pat. No. 4,433,082 to Grot. The compositions in accordance with the inventions contain at least about 25 weight % particles having a particle size of about 2 nm to about 30 nm. Preferably, the compositions contain at least about 50% by weight, most preferably 90% by weight, of particles having a particle size of about 2 nm to about 30 nm. Typically, the percentages of particles in the size range of about 2 nm to about 30 nm will be greater in compositions made with lower ion exchange ratio (lower equivalent weight) polymers.

The particle size in liquid compositions in accordance with the invention can be measured by small angle X-ray scattering (SAXS). In solid compositions, particle size can be measured by transmission electron microscopy (TEM). Since the particles using polymer in normal molecular weight ranges typically have an aspect ratio in the range of about 5:1 to about 6:1, particle size as used in this application refers to the longest dimension of the particles.

The difference in particle size between compositions in accordance with the invention and compositions prepared by the process of U.S. Pat. No. 4,433,082 to Grot is seen clearly in small angle X-ray scattering (SAXS) data. FIG. 1 is a graphical representation of SAXS data in which relative intensity is plotted against scattering vector (q) in $nm^{-1}$ for samples of liquid (water only) compositions in accordance with the invention and a prior art liquid (alcohol/water) composition prepared as in U.S. Pat. No. 4,433,082. Samples of the invention are prepared as in Example 1, Part 1, described hereinafter except that 70 g of polymer are used to make the 22 weight % colloid which is appropriately diluted with water to make the lower solids samples. q (scattering vector) is defined as $4(\pi)/A \sin(B/2)$ with A and B being, respectively, the wavelength and the scattering angle. SAXS measurements are performed as described in "Small Angle X-ray Scattering", edited by O. Glatter and O. Kratky (Academic Press, London 1982).

The SAXS patterns of compositions in accordance with the invention show a sharp peak that shifts to lower q (or scattering angle) upon dilution. This suggests that the peak can be attributed to the nature of inter-particle interference. Thus, an averaged inter-particle distance (d) can be estimated from the peak position, $q_{(max)}$, in the plots of I•$q^2$, following Bragg's Law:

$$d=2(\pi)/q_{(max)}$$

d values are calculated to be 11.4 nm, 19.2 nm, and 23.8 nm, respectively, for the 22%, 8.3%, and 4.9% compositions depicted in FIG. 1. These SAXS patterns Indicate that the particle size giving rise to them is less than 11.4 nm.

In I•$q^2$ plots, one can also see a secondary peak, which is located at about 0.2 $q_{(max)}$, for compositions in accordance with the invention. The SAXS patterns suggest the presence of a large amount of particles of averaged particle size of less than 11.4 nm which are arranged in a fairly ordered fashion to rise to the sharp SAXS peaks and secondary peaks. The liquid composition made as in U.S. Pat. No. 4,433,082 have a very different pattern with only a shoulder in the range of q where the invention shows the strong peak. Assuming that this shoulder is a result of inter-particle interference as in the compositions of the invention, the compositions of the invention clearly have a much higher percentage of particles in the particle size range of about 2 nm to 30 nm.

As illustrated more fully in Example 8, Part 3, particle light scatter measurements on the aqueous liquid compositions in accordance with the invention using an argon ion laser show much less scatter than similar compositions prepared by the process of U.S. Pat. No. 4,433,082 to Grot.

Preferred solid compositions, including the compositions obtained upon drying preferred liquid compositions in accordance with the invention, are easily dispersible in water at room temperature. In contrast, solids recovered from compositions made by the process of U.S. Pat. No. 4,433,082 to Grot containing alcohols are not redispersible in water at room temperature and must be redispersed in alcohol or alcohol mixtures. The compositions made by redispersion of the preferred solid compositions and the preferred liquid compositions described in more detail hereinafter may be described as colloids of solid particles in a liquid since the particle size falls within the range of 5 to 5000 angstroms, the particles do not settle out rapidly, light scattering is observed and the viscosity is lower than would be expected for a true solution of the same polymer with the same concentration. The viscosity of the liquid compositions in accordance with the invention is lower than the viscosity of compositions having the same concentration of polymer but made by the process of U.S. Pat. No. 4,433,082 to Grot. Moreover, in most preferred compositions, a stable colloid in water at room temperature is provided. By "stable colloid" as used this application refers to a colloid which has properties which do not change substantially over period of 30 days when stored without agitation at room temperature. The solid compositions can also be dispersed in a polar, small molecule organic liquid such as a lower ($C_{1-4}$) alcohols, acetic acid, dimethylformamide, dimethylacetamide, γ-butyrolactone, dimethyl sulfoxide, ethylene glycol, acetonitrile, tetramethylene cyclic sulfone, succinonitrile, or mixtures thereof. The solid compositions, including the compositions obtained upon drying preferred liquid compositions in accordance with the invention, are preferably substantially free of components containing carbonyl bonds as determined by reflectance infrared spectroscopy. In contrast, reflectance infrared spectroscopy of solids recovered from compositions made by the process of U.S. Pat. No. 4,433,082 to Grot indicate bands at 1740 $cm^{-1}$ corresponding to the presence of carbonyl groups. It is believed that compounds containing carbonyl groups are formed during manufacturing due to the presence of alcohols in the dispersion process. Preferred compositions in accordance with the invention are also free of C—H bonds, i.e., no bands 2800–3000 $cm^{-1}$ occur in reflectance infrared spectroscopy, unless they are present in the polymer molecule, e.g., unfluorinated sites or quaternary amine cation associated with the —$SO_3$— group.

The exact form of the solid compositions can vary widely depending on the manufacturing process and/or desired end use and be in forms including powders, films, flakes, beads, etc. Friable particulate compositions for easy packaging, transportation and redispersion are advantageously produced using a drying process, e.g., freeze-drying. Spray drying at low temperatures is also useful for manufacturing the solid compositions.

The compositions in solid form have far lower measured surface areas than would be expected based on the particle size present. A formula often used to estimate surface area of a solid is:

$$S=6/(d \cdot D)$$

where d is the density (g/cc) of the material, D the ultimate particle size in µm (microns) that nitrogen can adsorb on, and S is the specific surface area in $m^2/g$. This formula is strictly valid for monodispersed (uniform) spheres and cubes with smooth surfaces. Solids with slightly skewed shapes will give approximately the same values. Solids with rough surfaces will give higher values. For 25 nm (0.025 µm) particles, the formula reduces to S=240/d. Since the density of the polymer is approximately 2.5 g/cc, the expected surface area based on the formula would be 96 $m^2/g$. This same calculation done using 10 nm (0.01 µm) particles is 240 $m^2/g$. When the surface area of solid compositions in accordance with the invention are measured with a Micromeritics ASAP 2400 adsorption apparatus by the BET method [S. Brunaurer, P. H. Emmett, and E. Teller, JACS, Vol. 60, 309 (1938)] using the absorption of liquid nitrogen at its boiling point, the surface area measured is approximately 1 $m^2/g$. This is very low for materials having such a small particle size. For example, silica with a similar particle size (~25 nm) has a surface area of about 100 $m^2/g$. It is believed that the low surface area is due to a very close packing of the particles.

Typically, the ion exchange polymers used to make the compositions in accordance with the invention contain water which becomes associated with the sulfonate groups in the polymer of the composition during manufacture or from exposure to moisture in the air. In the solid form, it is preferred for the compositions to have a water content of less than about 20% by weight, most preferably less than 15% by weight to minimize weight during shipping and to more easily provide free-flowing solids.

An aqueous liquid composition in accordance with the invention comprises an aqueous medium containing about 0.5 to about 50 percent by weight particles of the highly fluorinated ion-exchange polymer, at least about 25 weight % particles having a particle size of about 2 nm to about 30 nm. The aqueous liquid compositions in accordance with the invention can provide higher polymer solids content than known compositions of this type. Preferably, the composition comprises about 5 to about 40% by weight ion exchange polymer, more preferably, about 10 to about 40% by weight ion exchange polymer and, most preferably, about 20 to about 40% by weight ion exchange polymer.

Preferably, the compositions are substantially free of alcohols. Using a preferred process in accordance with the invention as will be described hereinafter, alcohols are undesirable in manufacturing and the problems associated with them are avoided using the preferred compositions. More preferably, the compositions are substantially free of all organic liquids. In most preferred compositions, the aqueous liquid medium consists essentially of water. "Consisting essentially of water" means that the medium contains at least 99% by weight water and thus provides a composition which is essentially only water containing the ion exchange polymer particles.

Preferred aqueous compositions are stable colloids (as defined previously). Surprisingly, such stable colloid compositions containing only water and the ion exchange polymer can have high polymer solids contents, i.e, up to 35% or higher even when high ion exchange ratio (high equivalent weight) polymer is used. The preferred aqueous compositions can be dried to form solid compositions in accordance with the invention which can be redispersed in water at room temperature, most preferably to form a stable colloid.

Thixotropic compositions can be made from the aqueous compositions in accordance with the invention by the addition of a suitable water soluble polymer. For example, polyacrylic acid having a suitable molecular weight range can be mixed with a liquid composition in accordance with the invention to form a homogeneous low viscosity liquid which, on standing, becomes a transparent gel and which will return to a liquid state upon further agitation.

A nonaqueous liquid composition in accordance with the invention employs a nonaqueous liquid medium containing less than about 5% by weight water. The nonaqueous medium preferably is one or a mixture of wide variety of polar, small molecule organic liquids. Preferably, the liquids are miscible with water. Most preferably, the composition is substantially free of water. By substantially free of water is meant that the composition contains less than 1% by weight water. Most preferred organic liquids include lower ($C_{1-4}$) alcohols, acetic acid, dimethylformamide, dimethylacetamide, =γ-butyrolactone, dimethyl sulfoxide, ethylene glycol, acetonitrile tetramethylene cyclic sulfone, succinonitrile or mixtures thereof.

The nonaqueous medium contains about 0.5 to about 50% by weight particles of a highly fluorinated ion-exchange polymer having sulfonate functional groups with an ion exchange ratio of less than about 33. At least about 25 weight % particles have a particle size of about 2 nm to about 30 nm. Preferably, the composition comprises about 5 to about 40% by weight ion exchange polymer, more preferably, about 10 to about 40% by weight ion exchange polymer and, most preferably, about 20 to about 40% by weight ion exchange polymer. Preferably, the nonaqueous liquid composition is a stable colloid.

Figure 2:
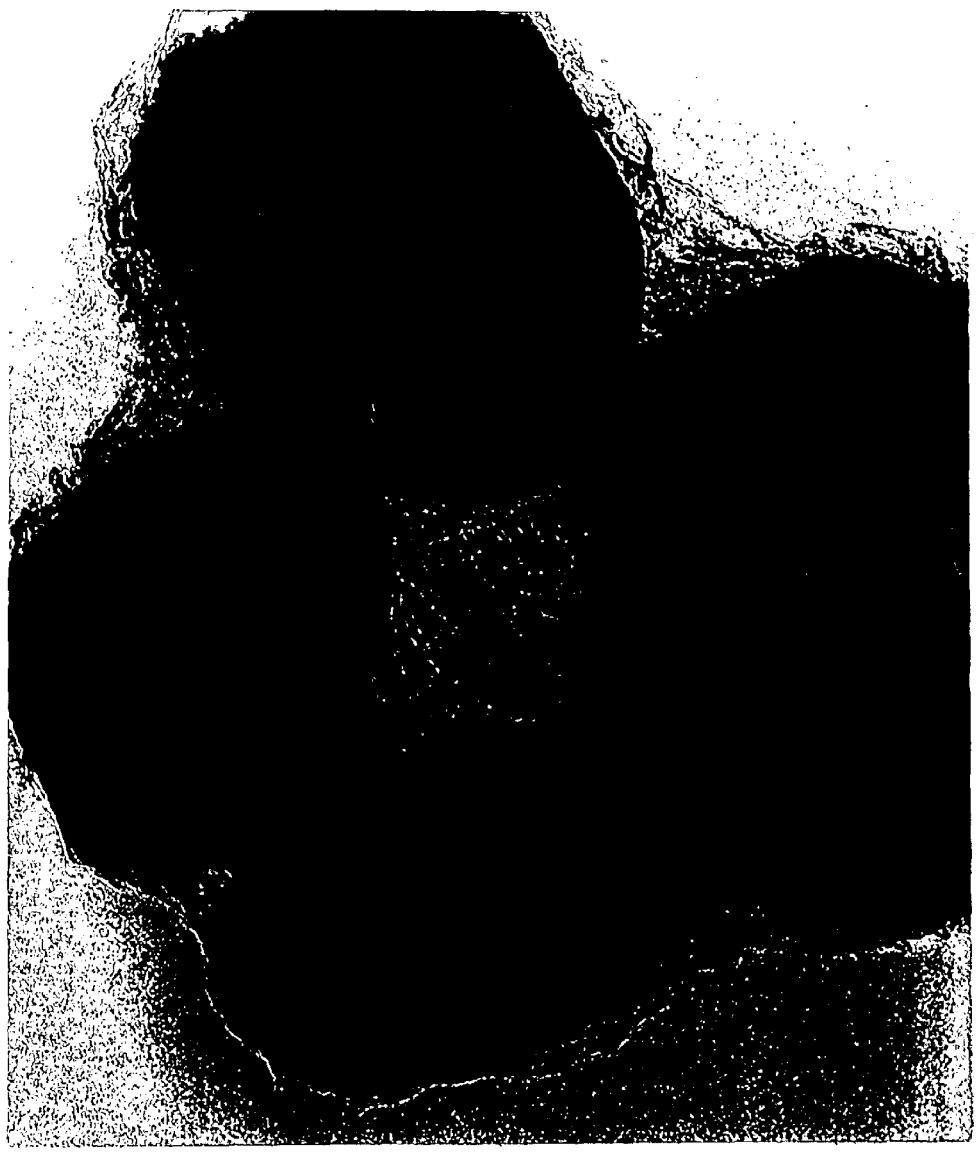
FIG. 2 is a transmission electron micrograph (TEM) of a solid composition in accordance with the invention deposited on $TiO_2$ particles.

It is believed that a significant portion of polymer particles in preferred liquid compositions in accordance with the invention resemble micelles. This is consistent with the stability observed for the preferred colloids. In the micelle-like particles in liquid compositions, the fluorocarbon backbone of the polymer would form a core and the side chains provided by the perfluorovinyl ether monomers which end in sulfonate groups would form a corona. While the micellular structure of the liquid composition may not be apparent in solid compositions of the invention, the small particle size structure exists which is believed to enable the particles to again form micelle-like structures under mild conditions thereby facilitating redispersion. The transmission electron micrograph (TEM) of FIG. 2 showing a solid composition of the invention deposited on larger $TiO_2$ particles indicates that the particles in solid composition have a short thread-like structure. Consistent with this structure and light scattering and SAXS data, the particles have a structure in which the fluorinated polymer chains are folded so that the fluorine atoms are oriented towards the particle's interior and the sulfonate groups are concentrated on the surface. In accordance with a preferred form of the invention, sufficient sulfonate groups are on the surface to make the material redispersible in water at room temperature.

Moreover, it is preferred for at least 50% of the particles of compositions in accordance with the invention to be monomolecular, i.e., that each particle consists of essentially one polymer molecule. Most preferably, at least 90% of the particles are monomolecular. As discussed above, while the compositions preferably are monomolecular in nature, the compositions are unlike true polymer solutions since have the low viscosity and light scattering characteristics of a colloid. The TEM of FIG. 2 illustrates the thread-like structure and small particle size of the particles in the composition as deposited on larger $TiO_2$ particles. Measurements based on the TEM show that a typical particle has a longest dimension of about 11 nm and a width of about 2 nm which, based on volume calculations, indicates a monomolecular particle.

In one preferred form of the invention, the aqueous and the nonaqueous liquid compositions in accordance with the invention further incorporate other particles of a different composition. The particulates are dispersed particularly easily in these compositions without the use of surfactants or other dispersion assists. The compositions including the additional particulates can also be highly stable. In preferred compositions, the particles of a different composition are selected form the group consisting of fillers (including fibrillating fluoropolymers), catalysts, conductive particles, reinforcing fibrils and mixtures thereof. The compositions are especially useful as high quality dispersions of such particulates for making coatings, as additives to other compositions, and other such purposes. The compositions are thus especially useful as catalyst ink formulations used for making electrodes for use in electrochemical cells such as fuel cells or electrolytic cells. The compositions including nonconductive particles are useful for making coatings such as the gas release coatings which are sometimes applied to membranes for use in chloralkali cells.

The compositions of the present invention are demonstrably different from those made in accordance with U.S. Pat. No. 4,433,082. SAXS data shows that particles in the size range of about 2 to about 30 nm comprise a substantial portion of the compositions of the invention whereas particles in this size range are largely absent from compositions made in accordance with U.S. Pat. No. 4,433,082. Preferred aqueous compositions are free of alcohols and most preferably free of other water-miscible organic liquids which are known to cause problems in the prior compositions. If desired, the aqueous compositions can contain nothing other than polymer and water. Accordingly, the liquid compositions are especially suitable for uses in which alcohols cause problems, i.e, applications using catalysts in which ignition of alcohol vapors is a potential risk.

The preferred compositions also have a very wide range of concentration which are stable colloids which do not exhibit the gelation which can occur with prior compositions. Viscosity is lower for compositions in accordance with the invention compared to known compositions with the same concentration. In addition, the compositions can be dried and reconstituted in water at room temperature which is a very surprising result for compositions of this type. No solid compositions are disclosed in U.S. Pat. No. 4,433,082 which are redispersible in water at room temperature.

Gelation can occur in liquid compositions with higher IXR (EW) polymers at higher concentrations. For example, 23 IXR (1500 EW) polymer at more than 10 weight percent polymer forms a gel upon standing for long periods of time. The addition of a quantity, e.g., 10%, of lower alcohol at ambient temperature restores fluidity to the compositions.

The compositions have excellent film forming ability and can be spun into fibers without additional formulation. Accordingly, the compositions are useful for making coatings, films, ion exchange membranes, fibers and other structures which are advantageously made of highly fluorinated polymer having sulfonate groups. Processes in accordance with the invention for making such articles are described hereinafter.

Processes for Making the Compositions

A process for preparing compositions in accordance with the invention comprises contacting the highly fluorinated ion exchange polymer in a pressurized vessel with an aqueous liquid dispersion medium under conditions which cause the polymer to form particles with at least about 25% by weight of said particles having a particle size of about 2 nm to about 30 nm. Preferably, the temperature employed is about 150° C. to about 350° C. Most preferably, a temperature of about 220 to about 300° C. is used.

In a preferred process in accordance with the invention, the aqueous liquid dispersion medium is substantially free of water miscible alcohols. Surprisingly, even over a wide range of ion exchange ratios (equivalent weights), no alcohol is needed to produce high solids content compositions as has been used in the practice of prior art processes such as the process disclosed by Grot in U.S. Pat. No. 4,433,082. Most preferably, the dispersion medium is substantially free of water miscible organic compounds. It is also preferable for the pH of the dispersion medium to be greater than about 1.

In one preferred form of the invention, the dispersion medium consists essentially of water. By "consisting essentially of water", means that the water comprises at least about 99% by weight water and that no solvents or additives are present which have a substantial effect on the dispersion process. In another preferred form of the invention, the dispersion medium comprises 0.5 to 75% by weight of a dispersion assist additive selected from the group consisting of nonreactive, substantially water immiscible organic compounds and carbon dioxide. Both of these forms of the invention can provide excellent products but provide somewhat different processing advantages.

The process where the dispersion medium consists essentially of water minimizes the requirements for chemicals and avoids the need to recycle or recover any organic compounds which also make the process very attractive for environmental and health and safety purposes. Use of the dispersion assist additive selected from the group consisting of nonreactive, substantially water immiscible organic compounds and carbon dioxide enables the process to be run faster or to use less severe temperature conditions.

With reference to the organic compound dispersion assist additives, "substantially water immiscible" is intended to mean that the solubility of the compound in water at 25° C. is less than 0.2% by weight. These compounds provide improved dispersion properties to the aqueous medium but are readily separated from the liquid product after processing.

One particularly preferred group of dispersion assist additives include nonreactive, substantially water immiscible aromatic compounds. Another particularly preferred dispersion assist additive is carbon dioxide.

In a preferred process of the invention, the contents of the vessel is sufficiently agitated during the contacting to subject the contents of the vessel to a shear rate of at least about 150 $sec^{-1}$. Agitation of this intensity is believed to promotes the formation of the particle size in the compositions in accordance with the invention and enables reasonably short processing times when higher concentration compositions are desired, particularly when the dispersion medium consists essentially of water. More preferably, the agitation during the contacting with the dispersion medium subjects the contents of the vessel to a shear rate of at least about 300 sec$^{-1}$, most preferably to a shear of at least about 1000 sec$^{-1}$. Agitation is suitably provided using rotating blades, impellers and the like. Alternately, ultrasonic devices can be used if desired.

Preferably, the contacting of the ion exchange polymer with the dispersion medium is performed for a period of less than about 10 hours, most preferably less than about 5 hours.

After the desired amount of polymer is dispersed within the dispersion medium, the contents of the vessel is cooled to a temperature of less than about 100° C. This enables the pressure to be reduced without the aqueous medium boiling and facilitates recovery of the aqueous liquid composition comprising particles of the highly fluorinated ion-exchange polymer. In some processes, it may be desirable during cooling to permit partial or full evaporation of the dispersion medium to produce a more concentrated liquid or a solid product, to decrease the energy needed for cooling, or for other purposes.

The processing conditions preferably cause the dispersion of the ion exchange polymer into particles of a highly fluorinated ion-exchange polymer having sulfonate functional groups having an particle size of about 2 to about 30 nm. Preferably, at least 25% by weight of such particles are formed in the composition.

In one particularly preferred embodiment of the process in accordance with the invention, the process is carried out in a stirred autoclave which is made of materials with the necessary corrosion resistance. Preferably, the vessel is made of an acid resistant alloy, e.g., Hastelloy® sold by the Haynes Company. The process can also be carried out in any pressurizable reactor vessel which has the capability to provide the required agitation and which is lined or plated with suitably inert materials such as poly (tetrafluoroethylene), glass or gold.

In a preferred form of the process, the recovered liquid composition is contacted with $H_2O_2$ for the purposes of decreasing odor and/or color. The compositions sometimes are contaminated with sulfur containing impurities because dimethyl sulfoxide is sometimes used to swell the polymer during hydrolysis to increase the reaction rate and the odor is believed to be due to sulfur containing impurities. Preferably, the recovered liquid composition is heated while it is contacted with $H_2O_2$, most preferably to about 90–100° C.

When it is desired for the particles in the resulting composition to be in the sulfonic acid (—SO$_3$H), it is preferred for the polymer used to initially be in the sulfonic acid form. When it is desired for the particles to be in metal or ammonium salt form, one preferred method for manufacture is for the polymer to initially be in the sulfonic acid form and contacting with the aqueous medium in the presence of a metal or ammonium salt of a weak acid whereby the particles in the recovered aqueous liquid composition are in metal or ammonium salt form. Metal or ammonium salts of carbonic acid, i.e, carbonates are especially useful.

The process of the invention initially produces an aqueous liquid composition containing the particles of the ion exchange polymer. If desired, solid compositions in accordance with the invention are advantageously produced from the liquid compositions by removing liquid components of the aqueous liquid composition. Preferably, the liquid components are removed by evaporation at a temperature less than the coalescence temperature of the ion exchanged polymer in the composition. By "coalescence temperature" is meant the temperature at which a dried solid of the polymer is cured to a stable solid which is not redispersible in water or other polar solvents under mild conditions, i.e., room temperature/atmospheric pressure.

Coalescence temperatures vary with polymer composition. A typical coalescence temperature for a TFE/PDMOF (—SO$_3$H) (IXR 14.7) (EW1080) copolymer is approximately 175° C. With the same polymer with an IXR of 23 (EW of 1500), the coalescence temperature is somewhat higher, i.e., approximately 225° C. With a TFE/POPF (—SO$_3$H) (IXR 12) (EW778) copolymer, the coalescence temperature is somewhat higher at the low IXR (low EW) values, i.e., approximately 225° C. Preferably, liquid components are removed from the composition by heating to a temperature of less than about 100° C. Freeze-drying is another preferred method to remove the liquid components since it produces a friable solid material which may be handled and redispersed particularly easily. Spray drying at a temperature less that the coalescence temperature is also effective for making redispersible powdered compositions.

Processes for Making Articles from the Compositions

A process in accordance with the invention for making a film of a highly fluorinated ion-exchange polymer having sulfonate functional groups includes casting a liquid composition comprising a liquid dispersion medium and about 0.5 to about 50% by weight particles of a highly fluorinated ion-exchange polymer having sulfonate functional groups with an ion exchange ratio of less than about 33. At least about 25 weight % of the particles in the liquid composition have a particle size of about 2 nm to about 30 nm. The liquid dispersion medium can be aqueous or nonaqueous as has been described for the liquid compositions in accordance with the invention. The casting is typically done onto a polymer belt from which the film can be easily released, i.e., poly(tetrafluoroethylene). Preferably, a surfactant is added to the liquid dispersion medium to lower the surface tension of the composition and promote the even distribution of the composition on the polymer belt.

After casting in the process of the invention, the liquid dispersion medium is removed from the composition to form an uncoalesced film of the ion exchange polymer. Preferably, this is accomplished by evaporation of the medium at a temperature below the coalescence temperature of the ion exchange polymer.

After removal of the liquid medium, the uncoalesced film is heated to above the coalescence temperature of the ion exchange polymer. Heating to above the coalescence temperature is believed to fuse the polymer particles to for a film stable in water and which has properties similar to films which have been extruded in the thermoplastic (—SO$_2$F) form and then subsequently hydrolyzed and acid exchanged to the (—SO$_3$H) form.

The invention is also provides a process for making an elongated shaped article, preferably a fiber, of a highly fluorinated ion-exchange polymer having sulfonate functional groups. The process includes extruding a liquid composition comprising a liquid dispersion medium and about 0.5 to about 50% by weight particles of a highly fluorinated ion-exchange polymer having sulfonate functional groups with an ion exchange ratio of less than about 33, at least about 25 weight % of the particles having a particle size of about 2 nm to about 30 nm. For extrusion, it is typically necessary to adjust the viscosity of the composition as needed so that the extruded composition retains its extruded shape.

Viscosity can be adjusted by increasing the concentration to a very high level or by adding water soluble polymers such as polyacrylic acid.

The invention also provides a process for making an article containing a highly fluorinated ion-exchange polymer having sulfonate functional groups by applying a liquid composition in accordance with the invention to a substrate. As in the method for making films, the liquid dispersion medium is removed from the liquid composition and the resulting uncoalesced film is heated to above the coalescence temperature of the ion exchange polymer. The process is advantageously used for nonporous substrates on which the ion exchange polymer forms a surface coating. The process can also be used for porous substrates into which at least a portion the ion exchange polymer penetrates and is incorporated into the interior of the substrate. Inert porous supports can be coated to make membranes, diaphragms and other structures for use in electrochemical cells, for humidification/dehumidification applications, separations and other uses. The process is also especially useful when the liquid composition also contains particles of a different composition which are incorporated onto the ion exchange polymer applied to the substrate.

In a preferred form of this process, the substrate comprises a fluoropolymer having a composition different from the ion exchange polymer and the liquid dispersion medium is aqueous and further comprises a surfactant to increase adhesion of the ion exchange polymer to the substrate. Preferred surfactants include perfluoroalkanoic acids with greater than about five carbon atoms and alkyl phenyl sulfonic acids. In another form of the invention where the substrate comprises a fluoropolymer having a composition different from the ion exchange polymer, the substrate is treated prior to application of the composition to increase adhesion of the ion exchange polymer to the substrate. A preferred treatment includes surface etching electrically with surface corona discharge or chemically with sodium ketyl from benzophenone. These preferred forms of the invention are especially useful for applying coatings to nonporous or impregnating porous fluoropolymers such as poly(tetrafluoroethylene) (PTFE) in various forms including fiber, fabric, or microporous or nonporous films of PTFE.

The following examples provide specific embodiments of the present invention and further illustrate its innovative aspects. Parts and percentages are by weight unless otherwise indicated.

In the examples, abbreviations are used as follows:
PTFE represents polytetrafluoroethylene;
TFE/PDMOF represents a copolymer of tetrafluoroethylene and perfluoro (3,6-dioxa-4-methyl-7-octenesulfonyl fluoride);
TFE/IPOPF represents a copolymer of tetrafluoroethylene and perfluoro (3-oxa-4-pentenesulfonyl fluoride); and
EW represents the equivalent weight of the fluoropolymer.

EXAMPLE 1

A 400 ml shaker tube made of an acid resistant alloy sold under the trademark HASTELLOY® C-276 by the Haynes Company is charged with 200 ml of water, 50 ml of benzene, and 25 g of a TFE/PDMOF copolymer having an IXR of 14.7 (EW of 1080). The TFE/PDMOF copolymer is in bead form with the —$SO_2F$ groups of the copolymer having been hydrolyzed and acid exchanged to the —$SO_3H$ form. The copolymer contains 13% by weight of absorbed water.

Part 1

The mixture is shaken at 230° C. for 5 hours. The liquid composition is separated from the immiscible benzene layer by means of a separatory funnel. The clear liquid composition, which had a light straw color, contains 11.2% by weight of solids, determined by drying an aliquot at 110° C.

Part 2

The above procedure is repeated except that no benzene is used; i.e. water and TFE/PDMOF copolymer only are added to the shaker tube. A clear liquid product is obtained which contains 7.5% by weight of solids.

Part 3

The above procedure is again repeated using all three ingredients, but the mixture is shaken at 280° C. for 30 min. The clear liquid product, after separation from residual polymer and benzene, contains 20.5% by weight of solids.

EXAMPLE 2

Liquid compositions are prepared using the procedure of Example 1, Part 1, with various amounts of beads of TFE/PDMOF copolymers (—$SO_3H$ form) of various equivalent weights (EW), and a variety of low water solubility organic compounds. In each Example, 200 ml of water is used, together with 50 ml of organic compound or a weight equivalent thereto. Details are given in Table 1 below, together with the percentage (by weight) of solids contained in the resulting liquid compositions.

The liquid composition prepared in Part 1, which has a polymer content of 22.7% by weight, has a viscosity similar to that of ethylene glycol.

TABLE 1

| Part | TFE/PDMOF g | IXR | EW | Org. Cmpd. | % Solids |
|---|---|---|---|---|---|
| 1 | 67 | 14.7 | 1080 | Benzene | 22.7 |
| 2 | 100 | 14.7 | 1080 | Benzene | 32.2[a] |
| 3 | 35 | 23 | 1500 | Benzene | 6.8 |
| 4 | 50 | 23 | 1500 | Benzene | 13.2[b] |
| 5 | 25 | 14.7 | 1080 | FC-75[c] | 8.3 |
| 6 | 25 | 14.7 | 1080 | Toluene | 10.0 |
| 7 | 25 | 14.7 | 1080 | Cyclohexane | 9.3 |
| 8 | 25 | 14.7 | 1080 | Naphthalene | 17.0 |
| 9 | 25 | 14.7 | 1080 | Fluorobenzene | 14.3 |
| 10 | 25 | 14.7 | 1080 | n-Heptane | 8.0 |
| 11 | 25 | 14.7 | 1080 | Benzene | 7.0[d] |
| 12 | 43.6[e] | 14.7 | 1080 | Benzene | 23.0 |
| 14 | 60[d] | 14.7 | 1080 | Biphenyl | 16.1 |

[a]= forms paste
[b]= 12 hour time
[c]= FC-75 is perfluoro butyl tetrahydrafurane
[d]= Ran at 170° C.
[e]= Hydrolyzed TFE/PDMOF copolymer is in the form of hot water-washed film.

EXAMPLE 3

Liquid compositions are prepared using the procedure of Example 1, Part 1, except that 60 g of hydrolyzed and acid exchanged (—$SO_3H$ form) TFE/PDMOF copolymer film (IXR 14.7) (EW 1070) is used. Varied amounts of benzene as the low solubility organic compound are used. Details and final solids concentrations in the liquid products are listed in Table 2 below:

TABLE 2

| BENZENE, ml | % SOLIDS (by weight) |
|---|---|
| 50 | >25 |
| 20 | 20.3 |
| 5 | 19.1 |
| 1 | 16.2 |
| 0 | 7.5 |

EXAMPLE 4

This example shows that the rate of liquid composition formation is enhanced by increased agitation.

Two liquid compositions are made using the same conditions, 5 hours at 230° C., but one example is carried out in a shaker tube of the type used in Example 1 and the other in a stirred autoclave. It is estimated that the stirred autoclave provides a shear rate of approximately 15,000 sec$^{-1}$. The shaker tube provides substantially less shear, i.e., shear rate of approximately 160 sec$^{-1}$. Each Part described below used excess TFE/PDMOF (—SO$_3$H form) (IXR 14.7 or 14.5) (EW1080 or 1070) so that some unchanged material remains in each after 5 hours.

Part 1

The shaker tube is charged with 200 ml H$_2$O and 25 g TFE/PDMOF (—SO$_3$H form) (IXR 14.7) (EW1080) in bead form. The product is a clear liquid composition containing 6.6% solids.

Part 2

The autoclave is charged with 600 g of the TFE/PDMOF (—SO$_3$H form) (IXR 14.5) (EW1070) in film form and 2000 ml water. The product is a clear liquid composition containing 15.8% solids.

EXAMPLE 5

This example shows that the liquid composition is formed faster at higher temperatures.

Liquid compositions are made as in Example 4, Part 2, except that 800 g TFE/PDMOF (—SO$_3$H form) (IXR 14.7) (EW1070) and 2500 ml water are used and the composition is formed at 255° C. for 2 hours. The liquid composition contains 23.5% solids. No solid TFE/PDMOF remains in the vessel.

EXAMPLE 6

A liquid composition is made in a shaker tube of the same type as used in Example 1 using 70g TFE/POPF (—SO$_3$H form) (IXR 12) (EW 778), 100 ml H$_2$O and 30 ml benzene and heated at 230° C. for 5 hours with shaking. The vessel was not shaken during the cooling. The clear liquid product contains 33.1% solids and had a viscosity approximating that of ethylene glycol. Compared to TFE/PDMOF (—SO$_3$H form) (IXR 14.7) (EW 1080), this viscosity is extremely low for this concentration.

EXAMPLE 7

This example shows organic liquids that can be used to redisperse solid polymer compositions prepared by drying the colloids below the coalescence temperature of the polymer. Films can be made from the redispersed compositions as illustrated in Part 3.

Part 1

The clear liquid composition containing 11.2% TFE/PDMOF copolymer prepared in Example 1, Part 1 is conventionally freeze-dried to a friable white solid. A clear liquid composition is readily reconstituted by shaking the solid with water at room temperature. Clear liquid compositions are also readily prepared from the freeze-dried solid by shaking with ethanol, isopropanol, trifluoroethanol, dimethylformamide, dimethylacetamide, γ-butyrolactone, or mixtures thereof with water at room temperature. However, a clear liquid composition is not formed from the freeze-dried solid by shaking with cyclohexanol, cyclohexane or benzene.

Part 2

Solid polymer compositions are prepared from the TFE/PDMOF (—SO$_3$H form) (IXR 14.5) (EW1070) colloid as prepared in Example 1, Part 1, and the TFE/POPF (—SO$_3$H form) (IXR 12) (EW780) colloid as prepared in Example 5.

A sample of each solid composition is placed in the liquids listed in Table 3 and shaken at room temperature.

TABLE 3

| Liquid | TFE/PDMOF IXR 14.5 (EW1070) | TFE/POPF IXR 12 (EW780) |
|---|---|---|
| methanol | + | + |
| ethyl alcohol | + | + |
| acetic acid | + | − |
| dimethylsulfoxide | + | + |
| ethylene glycol | + | + |
| CF$_3$CH$_2$OH | + | − |
| acetonitrile | + | + |
| γ-butyrolactone | + | + |
| dimethylformamide | + | + |

Code:
"+" Solid disperses in liquid
"−" Solid does not disperse in liquid

Part 3

A film is cast from 10% by weight solids dispersion of TFE/PDMOF (—SO$_3$H form) (IXR 14.5) (EW1070) in dimethylformamide onto a glass slide at room temperature. The film is exposed to the air until dry and then is heated to 65° C. for 5 minutes. The resulting film is colorless, transparent and smooth. The procedure is repeated with a 10% by weight solids dispersion TFE/PDMOF (IXR 14.5) (EW1070) in N-methyl pyrrolidone to produce a similar film.

EXAMPLE 8

This example illustrates that a liquid composition of this invention differs from a composition made using a water/alcohol medium as disclosed in Grot, U.S. Pat. 4,433,082.

Part 1—Preparation of Composition as Disclosed in Grot, U.S. Pat. No. 4,433,082

TFE/PDMOF(—SO$_3$H) liquid composition is prepared by the method described in Grot, U.S. Pat. No. 4,433,082. A 250 gallon HASTELLOY® (Haynes Company) tank, fitted with a two-stage prop-style agitator and oil-heated jacket, is filled with a liquid medium containing 209 kg of de-ionized water, 91 kg of 1-propanol and 43 kg of methanol, plus 32 kg of TFE/PDMOF(—SO$_3$H) (IXR 14.5) (EW1070) in bead form. This mixture is heated to a temperature of 232° C., then held at that condition for a period of 3 hours. After cooling to a temperature below 30° C. and venting ether vapors, some solid material remains in the vessel which is removed when the solution is passed through a filter. The product composition produced by this process contains approximately 9% by weight of TFE/PDMOF(—SO$_3$H) (IXR 14.5) (EW1070), which is diluted to approximately 5% by weight using water, 1-propanol and 2-propanol.

Part 2—Concentration/Alcohol Removal from Prior Art Composition—Viscosity

The above-described 5% by weight TFE/PDMOF (—SO$_3$H form) liquid composition is concentrated to 14% solids by vacuum distillation at 58° C. By using this vacuum distillation procedure, substantially all of the alcohols present in the composition are removed with the distillate. Upon cooling to room temperature, the concentrate set to a gel. When a sample of the gel is added to water, a fluid liquid composition again results indicating that conversion to a gel does not disastrously alter the particle structure in the composition.

In contrast, Example 6 illustrating the invention provides a liquid composition containing TFE/PDMOF (—SO$_3$H form) (IXR 14.7) (EW1080) in water having 23% solids. This composition did not show any gelation behavior even upon standing at room temperature for weeks and had viscosity of no more than that of ethylene glycol.

Part 3—Light Scattering

Using an argon ion laser to provide 10 mw of 514.5 nm light focused to a small volume in the sample, light intensity in photons/sec from scattering at 90° (I) of liquid compositions is measured. Samples 2 and 3 are made in accordance with Grot, U.S. Pat. No. 4,433,082. Samples 2 is a product made as described in Part 1 of this Example and Sample 3 is made as in Part 2 of this Example. Sample 1 is a composition made in accordance with the invention as in Example 1, Part 1, except that it is made with 98.5 g polymer in 187 ml water and 50 ml benzene to make a colloid with 18.4 weight % solids (some solids remained in vessel). The measured values are normalized to 1% and the value measured for a toluene control is subtracted. Table 2 shows the results which are the average of 10 runs of 10 seconds each with two additional data sets for Sample 3 due to the large variation measured for his sample. Samples 2 and 3 liquid compositions prepared by Grot process scatters light a great deal more than did the liquid composition of this invention (Sample 1).

EXAMPLE 10

This example illustrates heating to coalesce the dried liquid compositions to durable films.

Using the liquid compositions made according to the Example numbers indicated, films are cast onto microscope slides then dried at the temperatures indicated in Table 3 for 15 minutes. The durability of the film is tested by putting the slide in boiling water for 30 minutes. The film quickly detaches and became swollen in the water. The results are reported in Table 3 with stable films, i.e., those which do not tear or crack, indicated with a (+); whereas, unstable films are indicated by a (−), The liquid compositions are:

Sample 1—TFE/PDMOF (IXR 14.5) (EW 1070) composition prepared as in Example 4, Part 2, i.e., prepared in water at 230° C. for 5 hours except also containing benzene.

Sample 2—TFE/PDMOF (IXR 14.5) (EW 1070) composition of Example 5, i.e., prepared in water only at 255° C. for 2 hours.

Sample 3—TFE/PDMOF (IXR 23) (EW 1500) composition prepared as in Example 2, Part 3, i.e, prepared in water with benzene at 230° C. for 5 hours.

TABLE 2

| Sample | % Solids | I (Photons/sec) | I (Normalized) (Photons/sec/1%) | Ratio to Sample 1 | Subtracting the Toluene | | |
|---|---|---|---|---|---|---|---|
| | | | | | I (Photons/sec) | I (Normalized) (Photons/sec/1%) | Ratio to Sample 1 |
| Toluene | — | 7660 | — | — | — | — | — |
| 1 | 18.4 | 43709 | 2375 | 1 | 36049 | 1959 | 1 |
| 2 | 5.0 | 46981 | 9396 | 4.0 | 39321 | 864 | 4.0 |
| 3 | 14 | 345533 | 24681 | 10.4 | 337873 | 24134 | 12.3 |

Part 4—Redispersability of Dried Liquid Compositions

The prior art TFE/PDMOF liquid composition made as in Part 1 of this Example is dried at room temperature overnight on a PTFE film to produce a solid film. This solid film would not redisperse in water when shaken, boiled, or when sonicated. The clear liquid above the solid in these experiments did not scatter light indicating that even traces of dispersed colloid were not present the water.

A TFE/POPF (—SO$_3$H form) (IXR 12) (EW 778) colloid is made in accordance with Example 6 except that 60 polymer, 50 ml benzene, and 200 ml water is used to produce a colloid with 25 weight % solids. In contrast to the composition of the prior art, when this TFE/POPF colloid in accordance with the invention is dried at room temperature overnight on PTFE film to make a film, this film is easily redispersed in room temperature water simply by shaking.

EXAMPLE 9

This example illustrates the use of CO$_2$ to promote TFE/PDMOF liquid composition formation.

A shaker tube is charged with 60 g TFE/PDMOF (—SO$_3$H form) (IXR 14.7) (EW1080) as beads and 250 ml H$_2$O. After sealing the vessel, 40 g CO$_2$ is pumped in. The vessel was shaken at 230° C. for 5 hours at autogenous pressure (approx. 4300 psi—29600 kPa). The shaking is stopped and the vessel is cooled to room temperature. The gas is vented through a tube into a catch pan to collect the product that formed. The material remaining in the vessel is combined with that in the catch pan and placed in a separatory funnel to remove a small amount of white foam. No solid polymer remains in the vessel. The colorless and clear liquid composition contains 22.0% solids.

Sample 4—TFE/POPF (IXR 12) (EW 778) composition prepared as in Example 6, i.e., prepared in water with benzene at 230° C. for 5 hours (60 g polymer, 200 ml water, 50 ml benzene, 20% solids).

TABLE 3

| | Stability of Films in 100° C. H$_2$O | | | |
|---|---|---|---|---|
| Coalescence | Sample | | | |
| Temp. ° C. | 1 | 2 | 3 | 4 |
| 150 | − | − | − | − |
| 175 | + | + | − | − |
| 200 | + | + | − | + |
| 225 | | | + | + |

EXAMPLE 11

This example shows how the colloid can be made odorless when containing with sulfur containing contaminants.

A 23.5% solids TFE/PDMOF (—SO$_3$H) (IXR 14.7) (EW 1080) colloid made according to the procedure of Example 5, has a straw-like color and a foul odor believe to be due to sulfur-containing contaminants. 10 ml 30% H$_2$O$_2$ is added to 50 ml of the colloid. No temperature rise is observed. After three hours at room temperature, most of the foul odor is gone. On standing overnight at room temperature, its odor is completely removed. Since hydrogen peroxide is known to slowly decompose to water and oxygen, the hydrogen peroxide is presumed to have decreased to a level which is not detrimental in most uses of the composition.

EXAMPLE 12

This experiment illustrates that a TFE/PDMOF (—$SO_3H$) colloid applied to a rigid porous support transports water vapor very rapidly.

A 26.2% solids colloid is made according to the procedure of Example 1, Part 1, except that it is made in a stirred autoclave using 780 g TFE/PDMOF (—$SO_3H$) (IXR 14.5) (EW1070) film, 2 l water, and 500 ml benzene. The colloid is applied to the top surface of a fired but not glazed porous ceramic plate measuring 5¼"×5¼"×0.31" (13.3 cm×13.3 cm×0.79 cm). The colloid penetrates into the top surface of the plate and forms a film when dried at room temperature. The film formed is tested for gas tightness by flooding the top of the plate, i.e., the TFE/PDMOF film side, with n-heptane and contacting the underside with the open end of a rubber tube supplying $N_2$ at 7 inches $H_2O$ (1.7 kPa) pressure on under side of the plate. No bubbles form in the heptane.

Vapor pressure transport is tested by covering the top of the plate, i.e., the TFE/PDMOF film side, with a glass dome which has an O-ring seal for making a gas tight seal to the film on the top of the plate. The plate is placed on top of an open-topped vessel approximately half full of water to provide a water vapor containing space between the water and the bottom of the plate.

After purging with $N_2$, anhydrous $CaSO_4$ impregnated with $CoCl_2$ sold under the trademark DRIERITE® is placed in a dish inside the dome. DRIERITE® is blue when dry and pink when wet. DRIERITE® in a dish is also placed outside the dome as a control. The relative humidity this day is 30%.

In one hour, the control DRIERITE® turns lavender color caused by the presence of both pink and blue $CoCl_2$. The DRIERITE® inside the dome turns lavender in 20 minutes and completely pink in 1½ hours indicating transport of vapor across the plate coated with TFE/PDMOF. After 5 hours, the control is still lavender in color.

EXAMPLE 13

This example illustrates two methods for using the aqueous colloid of the invention to form an adherent layer of TFE/PDMOF polymer on PTFE.

Part 1

To 10 g of the TFE/PDMOF (—$SO_3H$ form) colloid (21% solids) prepared as in Example 4, Part 2, is added 0.03 g of the surfactant n-$C_7F_{15}CO_2^-NH_4^+$ sold under the trademark FC-143 by 3M, of Minneapolis, Minn. dissolved in 1 ml $H_2O$. This gives a clear fluid liquid which wet a PTFE fiber bundle sold under the trademark TEFLON® by the DuPont Company (400-60-0 Merge ITO 13 6.7 DPF Lot 12272). The fiber is soaked in the colloid for 15 minutes. After shaking off the excess liquid, the fiber is dried and then heated to 200° C. for a few seconds to coalesce the TFE/PDMOF . The bundle of fibers is now stiff and obviously coated.

Part 2

Another sample of the same bundle of PTFE fibers as used in Part 1 are surface etched with sodium ketyl from benzophenone. Sodium ketyl can be prepared by adding 1 g (0.043 mole) Na to 3.6 g. (0.042 mole) benzophenone in 100 ml tetrahydrofuran, first degassing by $N_2$ purge and then drying by passage through a bed of acid chromatographic alumina. This is carried out in a 200 ml 3-necked round bottom flask kept under $N_2$ purge to exclude oxygen and moisture.

The surface etched fibers are wrapped around a microscope slide and placed in the ketyl solution for 15 minutes. The slide with the fibers is rinsed with water, then acetone to remove residual benzophenone, then soaked in water. These fibers are wet by same colloid as used in Part 1 without addition of the FC-143. After soaking in the colloid for 15 minutes, excess liquid is shaken off. The fibers are dried and heated at 177° C. for 10 minutes. A portion of this product is redipped and the drying/heating step is repeated as above. A portion of the redipped product is soaked in water for 3 hours with no alteration of the coating.

EXAMPLE 14

This example illustrates impregnating a water-resistant, porous PTFE with a TFE/PDMOF (—$SO_3H$ form) isopropyl alcohol colloid.

A 5" circle of white microporous PTFE made as disclosed in PCT Publication No. WO94/00511, published Jan. 6, 1994, is held stretched in an embroidery hoop and is treated with a TFE/PDMOF (—$SO_3H$ form)/isopropyl alcohol colloid made by sonicating 10 g freeze dried TFE/PDMOF colloid made in accordance with Example 10, Sample 1, and 50 g isopropyl alcohol at room temperature. The alcohol colloid readily penetrates the porous PTFE making it semitransparent. After drying, the process is repeated until the final product contains 72% TFE/PDMOF which now was a light brown color. Because acetone could be pulled through the film under vacuum, the product still possesses some porosity.

EXAMPLE 15

This example illustrates the preparation of a TFE/PDMOF (—$SO_3H$ form) fiber.

A TFE/PDMOF (—$SO_3H$ form) colloid in water (22.2% solids) prepared as in Example 1, Part 1, is loaded into a syringe fitted with a #20 needle. The colloid is injected into concentrated HCl in a Petri dish to a thread about 2 inches (5 cm) long. The colloid sets up to a gel fiber and striations could be seen in the acid as it removes the water from the gel. The weak gel fiber is gently slid onto a microscope slide and the excess liquid on the slide is absorbed with paper.

After heating to 150° C., the fiber can be bent and pulled without breaking.

EXAMPLE 16

This example illustrates a thixotropic TFE/PDMOF colloid.

0.5 ml of 2% polyacrylic acid Mol. wt. 4,000,000 and obtained from Polysciences, Warrington, Pa., is added to 2 ml of 22% TFE/PDMOF (—$SO_3H$ form) (IXR 14.5) (EW1070) colloid in water. The heterogeneous mixture is sonicated in a cavitation mode. Quickly the mixture forms a homogeneous low viscosity liquid which, on standing, becomes a transparent gel. Sonication causes the gel to become fluid again.

EXAMPLE 17

This examples illustrates mixtures of colloid with other colloids.

2 g of the TFE/PDMOF (—$SO_3H$ form) colloid containing 23% solids made in accordance with Example 1, Part 1 are mixed with the following colloids:

Aqueous Perfluoroalkoxy Dispersion—(Teflon® 335—DuPont) Product: Thick, but pours.

Aqueous PTFE Dispersion—(Teflon® 3170—DuPont) Product: Thick, but pours

Aqueous Fluorinated Ethylene Propylene Dispersion—(Teflon® 1201—DuPont) Product: Cloudy, thick and pours Also, the three above experiments are repeated with the further addition of 2 ml silica colloid sold under the trademark LUDOX® by the DuPont Company. The colloids persist in all cases as viscous and slow-pouring liquids.

EXAMPLE 18

This example illustrates the preparation of TFE/PDMOF (metal salt form) colloids in accordance with the present invention.

Part 1

Part 1 illustrates the conversion of the TFE/PDMOF (—$SO_3H$ form) colloid with a metal compound. A variety of carbonates and bicarbonate are used because $CO_2$ is released as bubbles when a reaction occurs. Bubbles are seen immediately in every example even though some of the carbonates have very low solubility in water.

One ounce vials are charged with 3 ml of TFE/PDMOF (—$SO_3H$ form) (IXR 14.5) (EW1070) colloid (15.8% solids) made as in Example 4, part 2. The amounts of carbonates and bicarbonates as indicated in Table 4 are added and the result is shown in Table 4.

TABLE 4

| Compound Added (mg approx) | Immediate Observation Viscosity | Immediate Observation Transparency | After 1 hr. Viscosity | After 1 hr. Transparency | After 6 hrs. Viscosity | After 6 hrs. Transparency |
|---|---|---|---|---|---|---|
| $Li_2CO_3$ (40) | low | + | low | + | low | + |
| $NaHCO_3$ (40) | low | + | viscous | + | viscous | + |
| $CaCO_3$ (15) | low | + | low | + | low | + |
| (50) | more | + | gel | cloudy | gel | cloudy |
| $ZnCO_3$ (45) | low | haze unreacted $ZnCO_3$ | | | | |
| $Ag_2CO_3$ (50) | low | + straw color | low | + straw color | low | + straw color |
| $MgCO_3$ (45) | low | some haze | low | haze | low | haze |

Part 2

Part 2 illustrates making TFE/PDMOF colloids from film in sodium salt form.

TFE/PDMOF (—$SO_3H$ form) (IXR 14.5) (EW 1070) film is soaked in aqueous 4% NaOH for 5 days to convert it to the sodium salt form. The product is rinsed, soaked in water one hour, and dried. 60 g of this product is converted to a colloid in accordance with the procedure of Example 1, Part 1 except that 60 g of the polymer in film form used. The product is very viscous, the consistency of honey. The benzene is removed by evaporation leaving a colorless, transparent very viscous mass.

EXAMPLE 19

This example illustrates the stability of the TFE/PDMOF (—$SO_3H$ form) colloids. The colloids described in Table 5 are stored at room temperature from the day of preparation and are unchanged after the time periods indicated.

TABLE 5

| Sample | Age mo. | IXR | EW (g) | $H_2O$ ml | Benzene ml | Time hrs. | Temp. °C. | Solids Content |
|---|---|---|---|---|---|---|---|---|
| 1 | 5.5 | 14.7 | 1080 (25) | 200 | 50 | 5 | 230 | 10 |
| 2 | 5.5 | 14.7 | 1080 (20) | 200 | 0 | 5 | 230 | 6.6 |
| 3 | 5 | 23 | 1500 (30) | 200 | 50 | 5 | 230 | 8.0 |
| 4 | 5 | 14.7 | 1080 (436) | 200 | 50 | 5 | 230 | 23.0 |
| 5 | 3.5 | 14.5 | 1070 (600) | 2000 | 0 | 5 | 230 | 15.8 |

EXAMPLE 20

As indicated in Table 6, liquid compositions are prepared with various amounts of beads of TFE/PDMOF copolymers (—SO3H form) of 23 IXR (1500 EW) at various temperatures and for various times in water. With the exception of Part 1 (see footnote), procedure of Example 1, Part 2 is used. The resulting compositions are examined for insoluble material, allowed to settle, clear liquid drawn off and percentage solids by weight determined. In Parts 3, 4 and 5 the undispersed water-swollen pellets are recovered by filtration, rinsed with water and dried and used for Part 8.

The amount of 1500 EW polymer in the clear liquid relative to the amount charged is used to determine the solution yield. The "Wt % Goal" column in the Table assumes that all 100% of charged polymer is dispersed. This example illustrates that the solution yield as a percentage of the polymer charged is a function of the temperature of the run and not of the amount charged or length of time at temperature. At 260° C. (Parts 2 to 5), about 48% is dispersed Into the clear liquid phase and the rest is recovered as undispersed pellets no matter what the dilution or heating time. At 300 C (Parts 6 to 8) all polymer goes into the liquid phase. Furthermore the insoluble fraction of pellets recovered from Parts 2 to 5 at 260° C. are dispersed fully into the liquid phase at 300° C. (Part 8) and no insoluble pellets remain.

The clear liquid dispersions of 1500 EW polymer are stable indefinitely except when there is more than 10 weight percent solids. The liquid from Part 7 containing 14.6% solids, after days, sets up into a hazy stiff gel. This gel is broken by adding 1 part methanol to 10 parts gel. After shaking in a glass jar at ambient temperature and pressure it becomes very fluid.

TABLE 6

| Part | Wt % Goal | Shaker Tube Temperature | Time (hr) | Weight % Solution | Solution Yield | Comments |
|---|---|---|---|---|---|---|
| 1* | 14.9 | 230° C. | 5 | 6.8 | 45.7% | Example 2, Part 3 |
| 2 | 16.7 | 260° C. | 5 | 8.4% | 50.4% | Pellets remain |
| 3 | 9.1 | 260° C. | 5 | 4.0 | 44% | Pellets remain |
| 4 | 9.1 | 260° C. | 24 | 4.4 | 48.4% | Pellets remain |
| 5 | 13.0 | 260° C. | 8 | 6.5 | 49.8% | Pellets remain |
| 6 | 9.1 | 300° C. | 5 | 9.0 | 98.9% | Clear liquid |
| 7 | 15.0 | 300° C. | 5 | 14.6 | 97.3 | Pellets gone |
| 8 | 9.1 | 300° C. | 5 | 6.7 | 87.9 | Insolubles from 260° C. runs |

*Example 2, Part 3 repeated here (contains benzene).

EXAMPLE 21

To 100 grams of the liquid composition made by the procedure of Example 5 (14.5 IXR—1070 EW polymer containing 0.026 equivalents—$SO_3H$ groups) and 20 milliliters of water is added with stirring over 7 minutes a solution of 0.62 grams (0.026 equivalents) of lithium hydroxide in 20 milliliters of water. The resulting clear liquid contains 24.6% solids. The solution remains clear, is very light amber in color, has a moderate viscosity and is free flowing for months. It is readily cast on KAPTON® polyimide film (DuPont Company) and cured at 225° C. to give a clear colorless coating which can be peeled off as smooth strong clear films. The cast films of lithium salt (—$SO_3Li$) of 1070 EW polymer are particularly good at remaining light colored after high temperature cures compared with the proton form (—$SO_3H$).

What is claimed is:

1. A liquid composition comprising a liquid dispersion medium containing particles of a highly fluorinated ion-exchange polymer having sulfonate functional groups with an ion exchange ratio of less than about 33, at least about 25% by weight of said polymer particles having a particle size of about 2 nm to about 30 nm, and particles of a different composition dispersed in said medium, said liquid dispersion medium being an aqueous liquid dispersion medium.

2. The composition of claim 1 wherein at least about 50% by weight of said polymer particles have a particle size of about 2 nm to about 30 nm.

3. The composition of claim 1 wherein at least about 90% by weight of said polymer particles have a particle size of about 2 nm to about 30 nm.

4. The composition of claim 1 wherein said particles of a different composition are selected from the group consisting of fillers, catalysts, conductive particles, reinforcing fibrils and mixtures thereof.

5. The composition of claim 1 wherein said aqueous liquid dispersion medium consists essentially of water.

* * * * *